(12) United States Patent
Voss et al.

(10) Patent No.: US 7,312,821 B2
(45) Date of Patent: Dec. 25, 2007

(54) TIME-SLICED STILL IMAGE GENERATION

(75) Inventors: James S. Voss, Fort Collins, CO (US); James W. Owens, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 10/454,188

(22) Filed: Jun. 3, 2003

(65) Prior Publication Data

US 2004/0246344 A1 Dec. 9, 2004

(51) Int. Cl.
*H04N 5/225* (2006.01)
(52) U.S. Cl. .................. 348/220.1; 348/231.2
(58) Field of Classification Search ...... 348/220.1–265
See application file for complete search history.

(56) References Cited

U.S. PATENT DOCUMENTS

| | | | |
|---|---|---|---|
| 6,490,408 B1 * | 12/2002 | Um et al. ................... 386/94 |
| 6,680,748 B1 * | 1/2004 | Monti ...................... 348/220.1 |
| 6,819,359 B1 * | 11/2004 | Oda .......................... 348/247 |
| 7,110,025 B1 * | 9/2006 | Loui et al. ............... 348/220.1 |
| 2001/0054744 A1 * | 12/2001 | Scott-Thomas ............. 257/443 |
| 2002/0001035 A1 * | 1/2002 | Haneda ...................... 348/220 |
| 2003/0095191 A1 * | 5/2003 | Saito ....................... 348/220.1 |
| 2004/0201699 A1 * | 10/2004 | Parulski et al. ......... 348/207.99 |

* cited by examiner

*Primary Examiner*—David Ometz
*Assistant Examiner*—Pritham Prabhakher

(57) ABSTRACT

A method is disclosed for capturing images, including reading image data in an image sensor from a photodetector array in the image sensor, and processing the image data in the image sensor. The method alternates between processing the image data to generate video frames and to generate portions of still images. A plurality of video frames are processed in the time it takes to process a complete still image. The video frames have a lower resolution than the still images.

20 Claims, 8 Drawing Sheets

TIME-SLICED STILL IMAGE GENERATION

BACKGROUND

Electronic imaging devices such as digital cameras and video recorders have become extremely widely used as image quality and usability have improved and cost has gone down. Acceptance of digital cameras which capture still images has grown as the resolution and quality of their image sensors and of photographic printers has increased. Relatively inexpensive digital cameras are currently available whose image sensors have millions of picture elements (pixels). Digital video cameras are also gaining acceptance as they gain features such as low-light sensitivity, infrared detection, and digital zoom, with their resolution at least as good as analog consumer video cameras.

However, users must still carry two different digital imaging devices for simultaneously capturing quality still images and video. Many digital cameras now include a mode for recording short segments of low quality video at a low frame rate with poor sound, and many digital video cameras can capture still images, but at the relatively lower resolution used in video cameras.

These imaging devices which attempt to bridge the gap between digital cameras and video recorders thus perform only one of the two tasks well, either capturing higher resolution still images or lower resolution video. Typically, these imaging devices are based on an image sensor which can produce at least two resolutions at the output, one higher than the other, but only one at a time. The image sensor generally includes internal circuitry for reducing the resolution at the output from the maximum, and this circuitry can be enabled or disabled to filter the output. Thus, the image sensor can either produce the maximum resolution at the output or a reduced resolution, but not both. Because digital cameras and video recorders use image sensors with either a single available resolution or these multi-resolution image sensors with separately selectable resolutions, the digital imaging devices are configured for one type of imaging. Furthermore, because of these limitations, the digital imaging devices are typically designed to do only one thing well, with badly performing secondary modes.

Users of these digital imaging devices are thus forced to either use two different devices for quality still imaging and video recording, or to use only one device but settle for high quality images in only one of two modes.

SUMMARY

An exemplary embodiment of the invention may consist of an image sensor having a photodetector array. An image processor is connected to the photodetector array for processing data from the photodetector array. A controller is connected to the image processor to control the data processing. The controller includes instructions for processing a portion of a still image in between processing video image frames. The still image has a higher resolution than the video image frames.

Another exemplary embodiment of the invention may consist of a method for capturing images, including reading image data in an image sensor from a photodetector array in the image sensor, and processing the image data in the image sensor. The method processes the image data, alternating between generating video frames and generating portions of still images. A plurality of video frames are processed in the time it takes to process a complete still image. The video frames have a lower resolution than the still images.

Another exemplary embodiment of the invention may consist of an image sensor having means for capturing and processing image data for a stream of lower resolution images and at least one higher resolution image. The stream of lower resolution images is captured and processed at a given rate. The capturing and processing of image data for the at least one higher resolution image is subdivided into portions to perform between the capturing and processing of lower resolution images in the stream so that it does not interfere with the given rate. The image sensor also includes means for outputting the stream of lower resolution images and the at least one higher resolution image.

BRIEF DESCRIPTION OF THE DRAWING

Illustrative embodiments of the invention are shown in the accompanying drawing, in which.

DESCRIPTION

Figure 1:
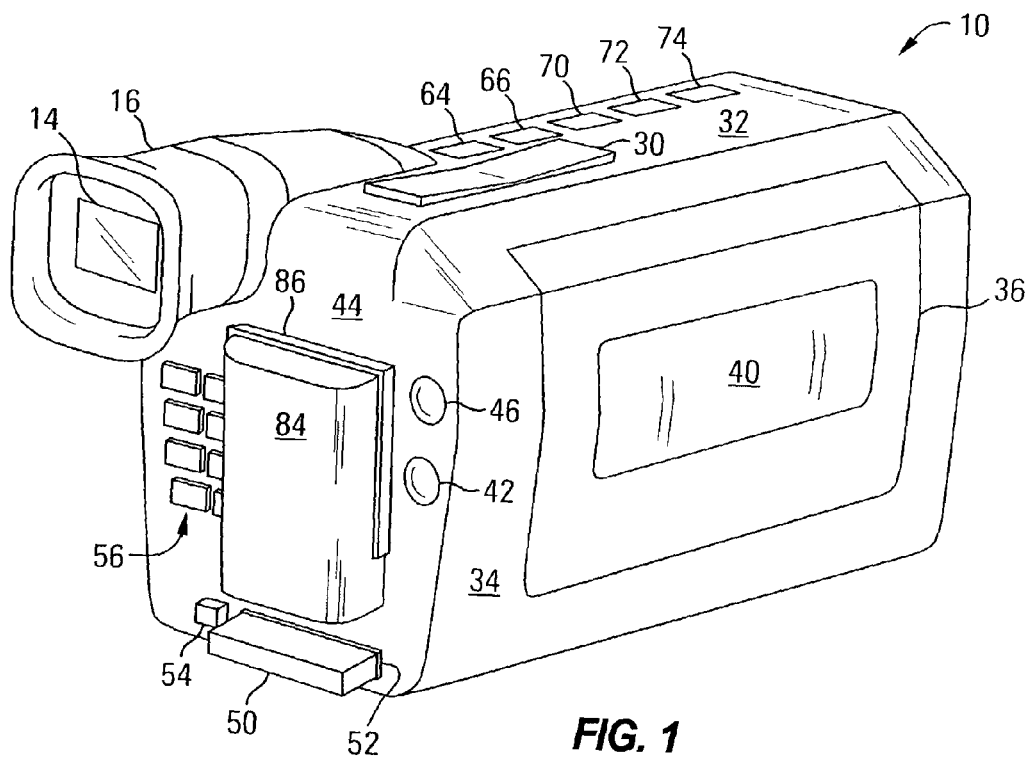
FIG. 1 is an isometric rear view illustration of an exemplary embodiment of an imaging device.

The drawing and description, in general, disclose an imaging device with an image sensor for capturing high resolution still images at the same time that lower resolution video is being captured. An image sensor in the imaging device captures a video stream consisting of a series of relatively low resolution video frames. For example, a typical video resolution is 640×480 pixels. The video stream of an exemplary embodiment is captured at a constant framerate, such as 30 frames per second (fps). Alternatively, the imaging device and image sensor may capture the video stream at a variable framerate, but the capturing of still images does not interfere with the desired frame rate of the video stream.

Higher resolution still images may be captured simultaneously without interrupting the video stream, by breaking up time-intensive tasks in the still image capture process, and performing the resulting partial tasks in any free time between the processing of video frames in the image sensor. The still images may be captured at any desired resolution, up to the maximum resolution of a light sensitive photodetector array in the image sensor. (Processing techniques may also be used to further increase the resolution of the still images beyond the maximum physical resolution of the photodetector array if desired.)

The time-sensitive tasks which may be subdivided in the still image capture process include any part of the process that takes too long to perform in the time remaining between capturing, generating and outputting video frames in the video stream. Specific examples of these tasks include exposing the photodetector array in the image sensor to generate image data for the high resolution still image, moving the image data for the high resolution still image in the image sensor, performing any desired image processing on the high resolution still image, such as normalization, white-balancing, demosaicing, etc., and outputting the high resolution still image from the image sensor. Thus, as will be described below, the still images may be captured with a rolling shutter, capturing a portion of an image at a time between video frames to reduce exposure time. If the image data is captured with a rolling shutter, that is, the image data for a still image is captured piece by piece at different times, the image data may later be post-processed to remove any blurring effect caused by the delay between capturing each piece of the still image. The still images may also be processed in portions or slices, as processing time is available between video frames. The still images may also be output in slices from the image sensor to storage or display devices in the imaging device, with the resulting slices recombined outside of the image sensor to form complete high resolution still images.

The time remaining between capturing, generating and outputting video frames in the video stream may be dependent upon many factors, such as the resolution of the video frames, the processing power and speed of the image sensor, the data transfer speed of the image sensor, the exposure time of the photodetector array in the image sensor, etc.

In another exemplary embodiment to be described below, the image sensor in the imaging device also includes a memory capable of holding the image data from the photodetector array in the image sensor. In this embodiment, the image data for a single high resolution still image is copied from the photodetector array to the memory in the image sensor in a single operation. That is, the image data for the single still image is generated in a single simultaneous exposure of the photodetector array, then copied to the memory. The image data may then be processed and output in slices from the memory, preventing any interruption of the video stream and avoiding any need for post-processing to remove rolling shutter blur.

Thus, a single digital imaging device having an image sensor as described herein provides both high quality high resolution still images and high quality video at the desired lower resolution tailored for output devices such as televisions and computer monitors. This enables a user to capture both video and still images simultaneously without having to manage two different imaging devices at the same time. The still images and video are produced at the same high quality expected from devices dedicated to one or the other imaging format. The result is a simpler imaging process at a lower overall cost.

Figure 2:
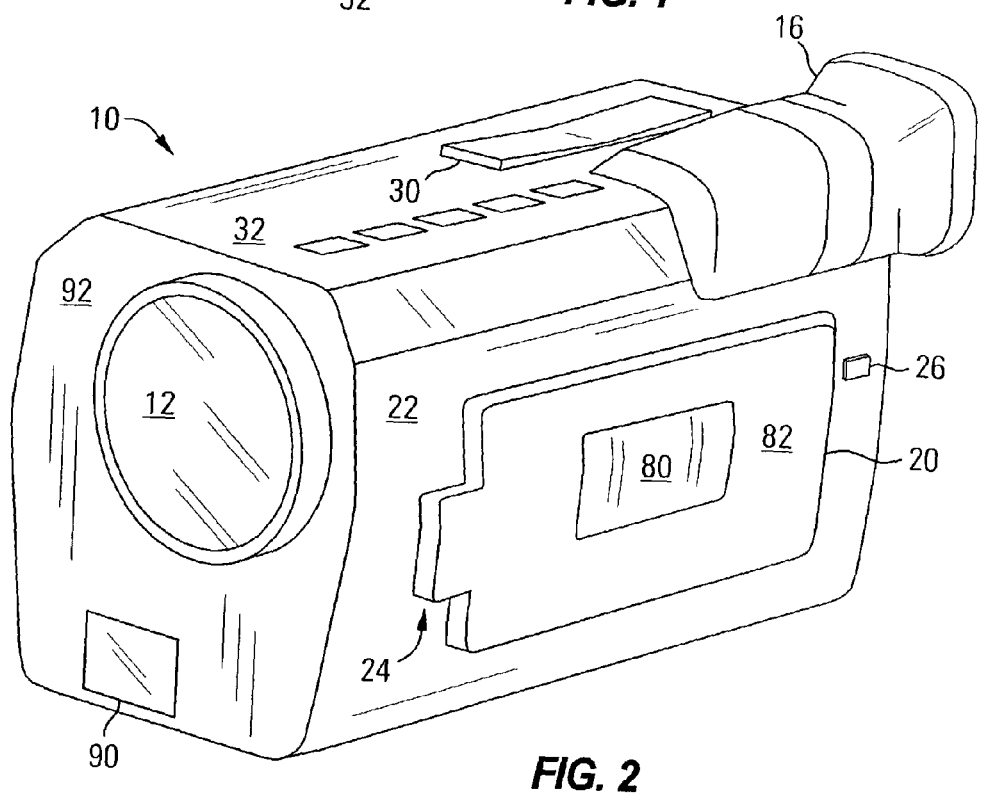
FIG. 2 is an isometric front view illustration of an exemplary embodiment of an imaging device.

Referring now to FIGS. 1 and 2 simultaneously, an exemplary embodiment of an imaging device 10 for capturing both high resolution still images and lower resolution video will be described. Note that the shape, options and configuration of the imaging device 10 are purely exemplary, and that any suitable alternative configurations are within the scope of the invention.

The imaging device 10 includes a lens 12 through which image light passes. The term "image light" as used herein refers to the light reflected from the subject and focused onto the surface of the image sensor (e.g., 100, FIG. 3) inside the imaging device 10. The image sensor 100 of the exemplary embodiment consists of a complementary metal-oxide semiconductor (CMOS) sensor, a two dimensional optical detector. The image sensor 100 includes a photodetector array 102, a two dimensional array of individual cells or pixels, each of which collects or builds-up an electrical charge in response to exposure to light. Because the quantity of the accumulated electrical charge in any given cell or pixel is related to the intensity and duration of the light exposure, the image sensor 100 is used to detect light and dark spots in an image focused thereon. The image sensor 100 of the exemplary embodiment is a high resolution image sensor suitable for capturing still images as well as video. For example, the image sensor 100 may include millions of pixels.

The image light is converted into digital image data in the image sensor 100 in essentially three steps. First, the image light is converted into electrical charges. Second, the electrical charges are converted into more usable analog voltages by analog amplifiers. Finally, the analog voltages are digitized by one or more analog-to-digital (A/D) converters. The digital image data then may be processed and output from the image sensor 100 as will be described below. The image sensor 100 will be described in more detail below after the exemplary imaging device 10 has been described.

To aid the user in framing the subject, the image data may be displayed on a viewfinder display 14 in a viewfinder 16 which may be adjustable both in position and focus, as is known. The image data may also be displayed on a larger LCD panel 20 that may be extended from the left side 22 of the imaging device 10 on a hinge 24 by pressing an LCD release button 26. The focal length of the imaging device 10 may be adjusted by pressing a zoom control 30 on the top 32 of the imaging device 10.

The video stream produced by the image sensor 100 may be stored on a removable storage device such as a magnetic video tape. The right side 34 of the exemplary imaging device 10 includes a video tape compartment 36 with a window 40 through which the magnetic video tape can be viewed. The storage of the low resolution video may be controlled by a record button 42 on the back 44 of the imaging device 10.

High resolution still images may be captured and generated by the image sensor 100 in the imaging device 10 when a still image capture button 46 is pressed, and the resulting still images may be stored on a removable storage device such as a solid state memory 50. The solid state memory 50 may comprise any suitable storage device, such as a compact flash card, etc. The solid state memory 50 is inserted into a slot 52 in the back 44 of the imaging device 10, and may be ejected by pressing a memory eject button 54 or by simply pulling it out.

Other typical components may be included in the imaging device 10 such as control buttons 56 for configuring the imaging device 10, and playback buttons 64, 66, 70, 72, and 74 in the top 32 of the imaging device 10 for playing back stored low resolution video or displaying high resolution still images. Other display panels may be provided such as an LCD 80 on the back 82 of the larger LCD panel 20 for displaying any desired information, such as power status or free space remaining on the removable solid state memory 50. Power may be supplied by an AC adapter or a battery 84 connected to a battery clip 86 on the back 44 of the imaging device 10.

The exemplary embodiment of the imaging device 10 may include an active focusing component 90 in the front 92 of the imaging device 10. For example, the active focusing component 90 may include an infrared transmitter which illuminates the subject and an infrared receiver which receives the infrared light reflected from the subject. The active focusing component 90 compares the transmitted infrared with the received in any suitable manner, such as using triangulation, comparing the light intensity, or using light pulses to measure time differences. The active focusing component thus determines the distance from the imaging device 10 to the subject. The imaging device 10 may then focus the lens 12 accordingly.

In operation, the user aims the imaging device 10 at the subject, views the subject on the viewfinder display 14 or larger LCD panel 20, and presses control buttons 42 and 46 to record low resolution video and to capture high resolution still images, respectively. Thus, a single device 10 may be used to record both video and still images at the most optimum resolutions for each, simultaneously and simply.

Figure 3:
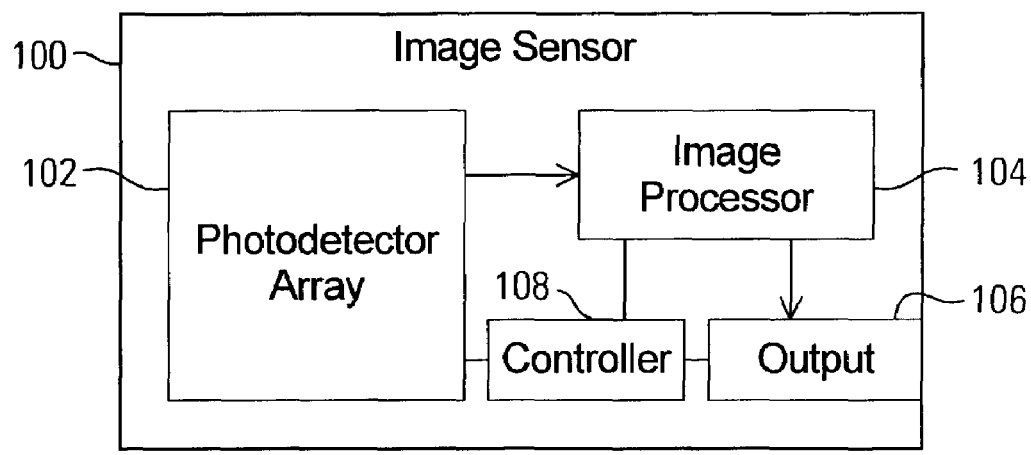
FIG. 3 is a block diagram of an exemplary embodiment of an image sensor for use in an imaging device such as that in FIGS. 1 and 2.

Referring now to FIG. 3, the image sensor 100 will be described in more detail. The image sensor 100 of the exemplary embodiment is a CMOS sensor, having both a light sensitive region (the photodetector array 102) and processing circuitry, such as an image processor 104, output circuitry 106, and a controller 108. The image processor 104 performs any desired image processing such as normalization, white balancing, and demosaicing. The controller 108 controls the process of splitting still image generation into slices which can be performed in free time left in video frame time slices. The controller 108 may comprise hardwired circuitry, software, firmware, an application-specific integrated circuit (ASIC), etc.

Alternatively, the image sensor 100 may comprise any suitable technology now known or that may be developed in the future for capturing image light, converting it to digital image data and for processing the resulting image data. The image sensor 100 of the exemplary embodiment may also be built on a single integrated circuit (IC) or chip, preventing data transfer delays that would reduce the amount of time in which still images could be processed between the processing of video frames in a video stream. Alternatively, the image sensor 100 may be build in another manner, such as using multiple ICs or a multichip module, if the data transfer remains fast enough to support processing and output of portions of still images without interrupting a video stream at its desired frame rate.

The frame rate is the rate at which video frames are produced in the video stream, typically measured in frames per second (fps). A high quality video stream is generally in the range of about 24 fps to about 30 fps. Slower frame rates may appear choppy to the human eye. In the exemplary embodiment of the imaging device 10 and image sensor 100, a constant frame rate is selected, such as 30 fps. Alternatively, a variable frame rate video stream may be produced, as long as generation of still images does not interfere with the production of the video stream at the desired frame rate.

The image sensor 100 includes a photodetector array 102, which is a two-dimensional array of light-sensitive pixels for converting image light into image data. The exemplary embodiment of the image sensor 100 is a CMOS sensor, in which the photodetector array 102 may be read non-destructively. That is, the image data generated by a single exposure to light may be read from the photodetector array 102 multiple times. An alternative embodiment of the image sensor 100 may be adapted to use a photodetector array 102 with a destructive type of read operation, such as serially shifting out the electrical charges as in a charge-coupled device (CCD).

In one embodiment, the image data from the photodetector array 102 may be read in various different configurable resolutions, such as a full resolution for still images or various reduced resolutions for video frames or smaller still images. When combined with non-destructive reading of image data as discussed above, this allows image data for a single exposure to be read once in low resolution for a video frame, then part or all of the photodetector array 102 to be read again in high resolution for a still image. Alternatively, the different resolutions used for video frames and still images may be generated outside of the photodetector array 102.

Any suitable technique may be used to generate different resolutions in the image data, whether currently known or developed in the future. For example, the image data may be downsampled, selecting only a subset of the available pixels, or a filter may be applied to the image data to reduce the resolution of the image data without image degradation. The resolution may also be reduced, either in the photodetector array 102 or outside it, by binning the image data, that is, combining information from multiple adjacent pixels into one pixel.

The exemplary embodiment of the image sensor 100 also allows reading of selected rows of pixels from the photodetector array 102 without having to read the entire photodetector array 102, although alternative embodiments of the image sensor 100 may be adapted to read only the full photodetector array 102. In the exemplary image sensor 100, the photodetector array 102 includes an amplifier at each pixel to amplify the charge built up when the pixel is exposed to light. Multiple A/D converters are included to enable reading of selected rows, rather than the entire image. The exemplary image sensor 100 also includes multiple reset lines on the photodetector array 102, so that the exposure may be started and stopped independently for different rows or groups of rows of pixels in the photodetector array 102. For example, multiple reset lines in the photodetector array 102 may be used to start an exposure of a few selected rows in the photodetector array 102 to capture only a portion of a high resolution still image.

The various exemplary embodiments of the imaging device 10 and image sensor 100 described above may be used to simultaneously generate a low resolution video stream and high resolution still images. This simultaneous generation of a video stream and still images generally involves splitting still image generation tasks so that portions of the still image generation may be performed in any available free time between generation of video frames. Various embodiments for the simultaneous generation of video and still images will be discussed below.

Figure 4:
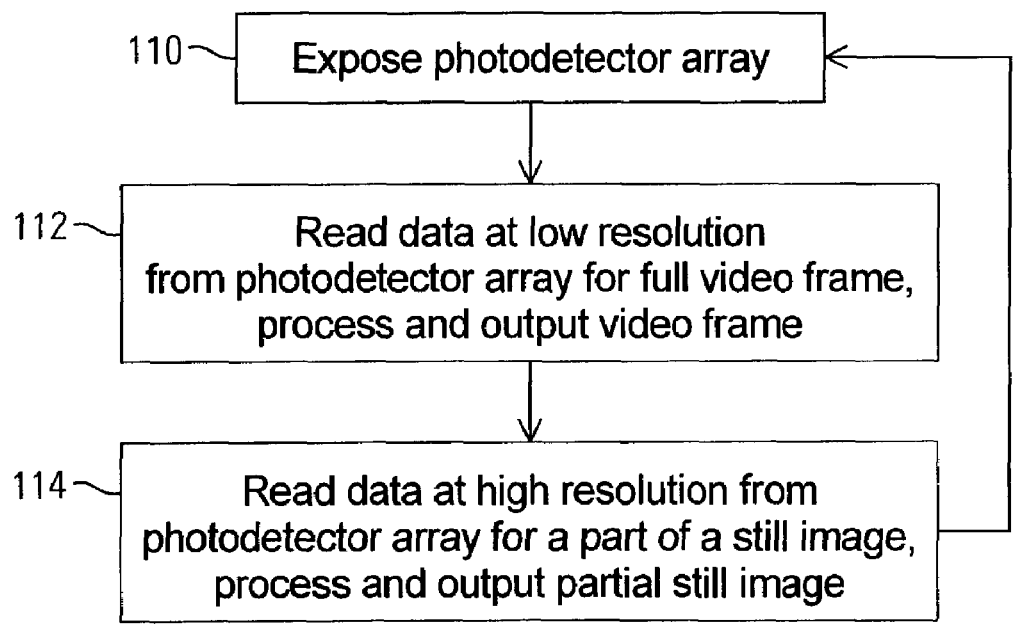
FIG. 4 is a flow chart of an exemplary operation for simultaneously capturing video and still images.

Referring now to FIG. 4, a first exemplary operation for simultaneously generating a video stream and still images will be described. The photodetector array 102 is exposed to image light to develop an electrical charge representing the image. This may be accomplished using either the photodetector array 102 reset lines discussed above or a physical shutter. The resulting image data is read 112 at low resolution from the entire photodetector array 102 for use in generating a video frame. The image data for the video frame is processed as needed. For example, the image data may be normalized and white-balanced. The resulting video frame is then output from the image sensor 100 through an output 106 on the image sensor 100, for display and/or storage in the imaging device 10.

The image sensor 100 then reads 114 the image data at high resolution from a portion of the photodetector array 102 for use in generating part of a still image. For example, the first 10 rows of high resolution image data may be read. The amount of high resolution image data read depends upon how much can be processed and output before the next video frame must be generated. The high resolution image data for a partial still image is processed and output from the image sensor 100, and the photodetector array is again exposed 110 for the next video frame and the next part of the still image. This process continues until all parts of the still image have been captured, processed and output from the image sensor 100. At this point, the video stream from the image sensor 100 continues, without capturing still images, until the imaging device 10 again requests a still image.

Note that some overlapping of tasks may be possible in the image sensor 100. For example, it may be possible to be exposing the photodetector array 102 for the next image while processing image data for the current image, by reading the image data from the photodetector array 102, then resetting the photodetector array so that it is collecting image light for the next image while processing the previously read image data.

Figure 5:
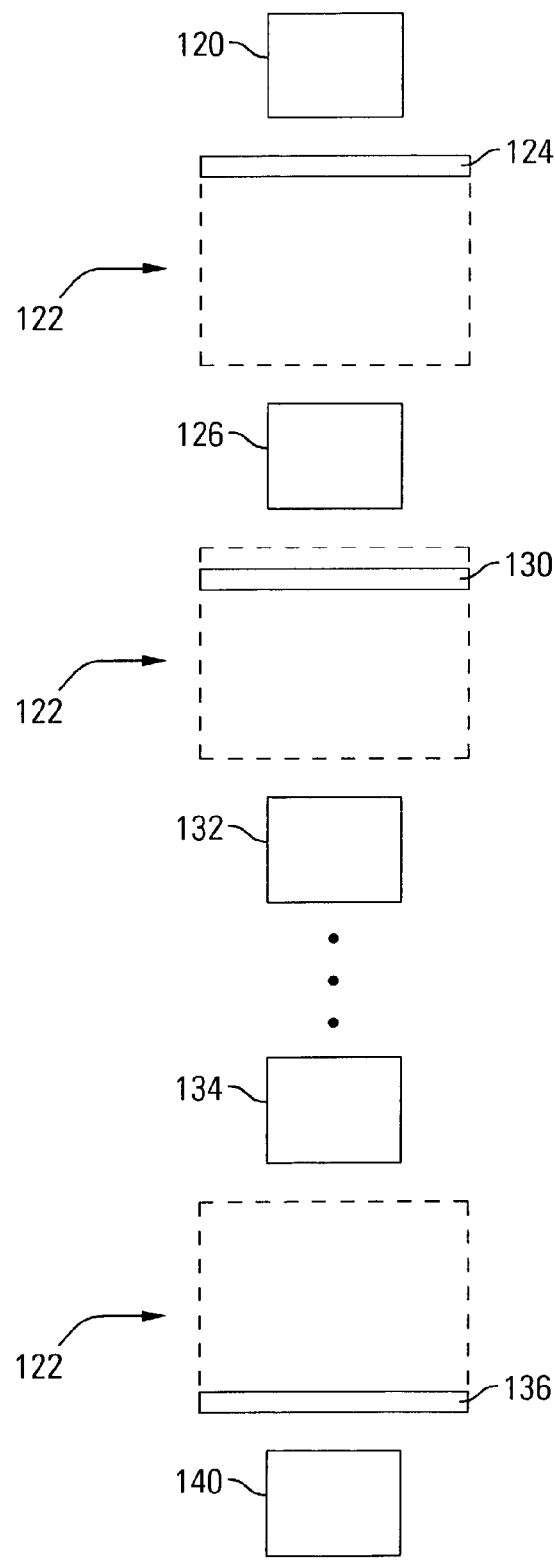
FIG. 5 is a block diagram illustrating an exemplary stream of video frames and portions of a still image.

The generation of a still image is broken up into as few portions as possible to reduce blurring due to a rolling shutter effect, as will be described in more detail below. The amount of high resolution image data that can be handled at any one time is dependent upon a number of factors, including the processing power of the image sensor 100, the data transfer speeds in the image sensor 100, the types of processing that must be performed on the image data, the video frame rate, etc. For example, a photodetector array 102 on the order of 4 megapixels may produce image data for a still image that is divided into 10 slices, each of which is processed between video frames, as illustrated in FIG. 5. A still image 122 is generated and processed in slices (e.g., 124, 130 and 136) that are output between full video frames (e.g., 120, 126, 132, 134 and 140) without interrupting the video stream or reducing the desired video frame rate. A first slice 124 of the still image 122 is processed and output after a video frame 120. The next video frame 126 is then produced and output, followed by the next slice 130 of the still image 122. The stream continues with slices of the still image 122 being processed and output between video frames until the last slice 126 of the still image has been processed and output. The imaging device 10 may then recombine the slices (e.g., 124, 130 and 136) of the still image 122 and display and/or store the resulting high resolution still image 122. (Note that the still image may be divided in any manner, and the selection of one or more horizontal rows is purely exemplary.)

The still image 122 may be post-processed in the imaging device 10 to remove any blurring caused by the rolling shutter. This rolling shutter effect is caused by capturing the still image in slices with multiple exposures at different times. The post-processing may comprise any suitable technique now known or that may be developed in the future, such as blur-removal filters and stitching software that aligns and combines multiple images.

Figure 6:
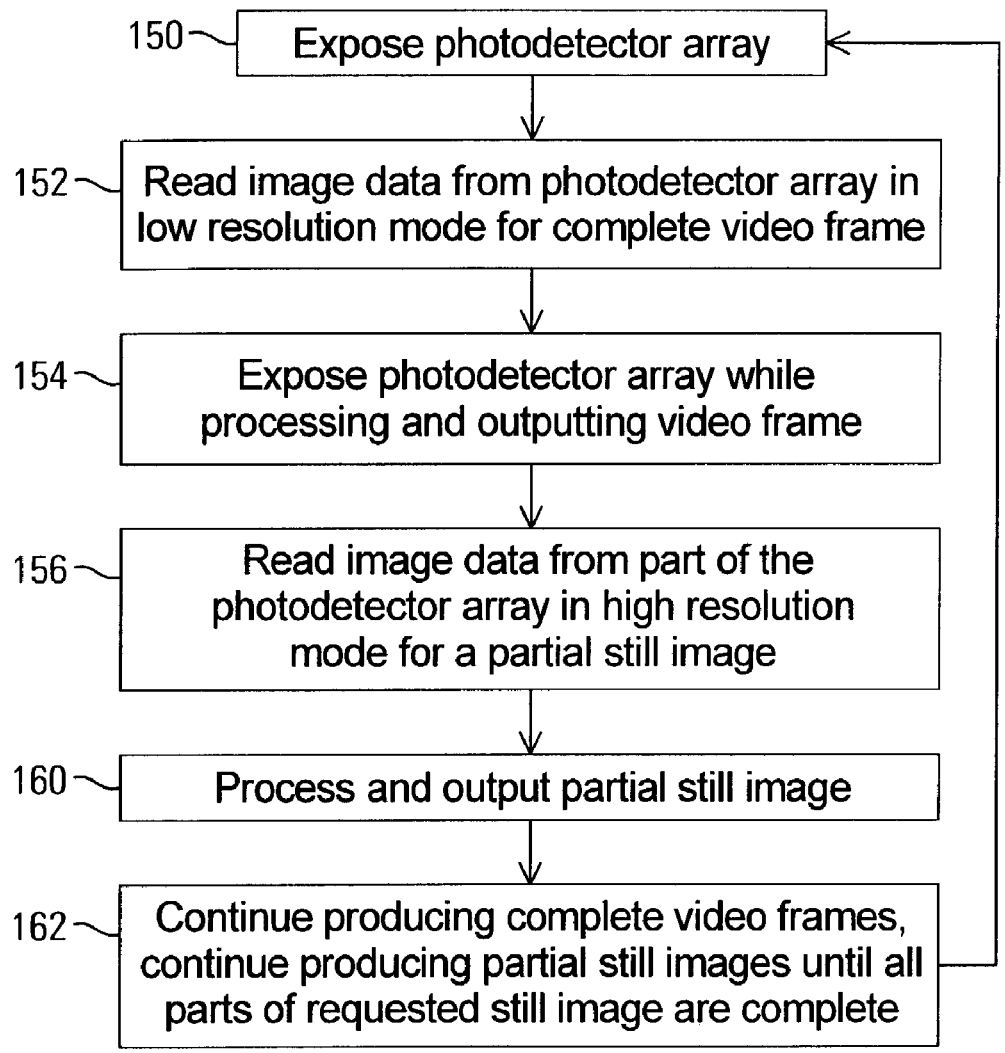
FIG. 6 is a flow chart of another exemplary operation for simultaneously capturing video and still images.

Referring now to FIG. 6, another exemplary embodiment of an operation to simultaneously capture video and still images will be described. In this embodiment, the photodetector 102 is exposed separately for video frames and portions of still images. This may be desirable for various reasons, such as if the photodetector array 102 can only be read destructively, or if it difficult to reduce the resolution of high resolution image data from the photodetector array 102 in the image sensor 100. In this embodiment, two exposures are made per video frame time slice (1/N seconds for N fps video). For video with a frame rate of 30 fps, the video frame time slice is ⅟30 of a second, and in this time, two exposures are made, a low resolution video frame is read, processed and output, and part of a high resolution still image is read, processed and output.

The photodetector array 102 is exposed 150, and the image data is read 152 from the photodetector array 102 in low resolution mode for a complete video frame. While processing and outputting the complete video frame, the photodetector array 102 is again exposed 154 for a portion of a high resolution still image. (Note that it may be possible to expose only that part of the photodetector array 102 needed for the still image portion, by releasing only the appropriate reset lines in the photodetector array 102, thereby saving power.) When the exposure is complete, the image data is read 156 from the photodetector array 102 for the portion of the high resolution still image. The portion of the high resolution still image is processed 160 and output from the image sensor. This operation continues 162 by exposing 150, processing and outputting successive video frames interspersed with portions of a high resolution still image until the high resolution still image has been completely processed and output. Again, as discussed above, the still image may then be recombined and post-processed to remove any blurring due to the rolling shutter.

Note again that some tasks may be performed simultaneously, such as exposing 150 the photodetector array for a video frame while the partial still image is being processed 160 and output, and exposing 154 the photodetector array for a portion of a still image while the video frame is being processed and output.

If the still image is divided into N slices to process during generation of a video stream at N fps, the still image will be completed in one second. Alternatively, the size of the still image slices may be maximized to reduce the time required to complete the still image and to minimize rolling shutter effects, without impacting the desired video frame rate.

Note that the order of processing may be varied if desired. The exemplary embodiment described above processes video frames first in a given video frame time slice, then a still image slice. This order may be reversed, processing the still image slice first, then the video frame. In this alternative, the reading of image data from the photodetector array 102 may be somewhat reduced by reading image data for the still image slice in high resolution, processing and outputting the still image slice, then reducing the resolution of the already-read image data for part of the video frame, and reading the remainder of the image data for the video frame at low resolution from the photodetector array 102. Similarly, the order of processing still image slices may be varied, such as processing and outputting slices at the end of a still image first and the start of the still image last.

Figure 7:
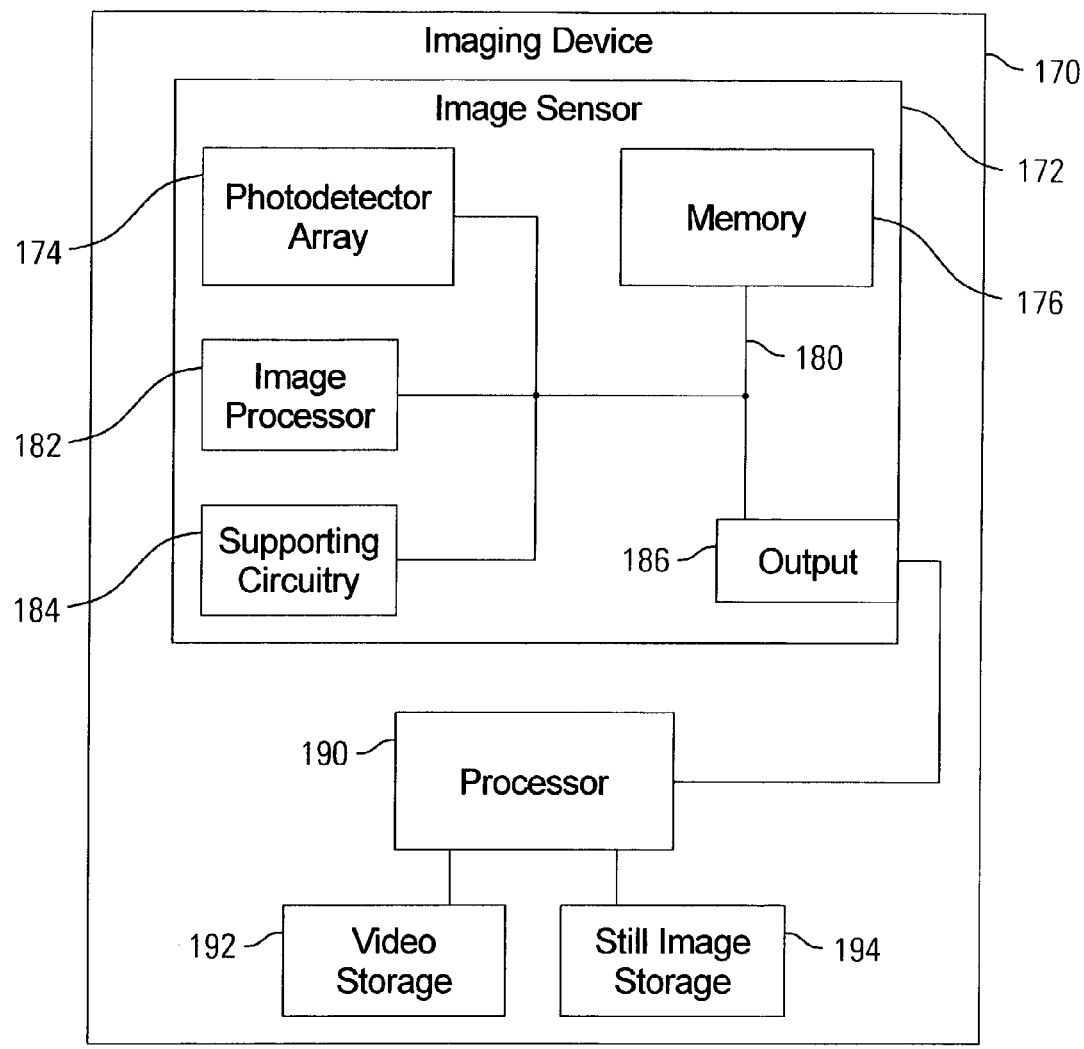
FIG. 7 is a block diagram of an exemplary embodiment of an image sensor having an internal memory for use in an imaging device such as that in FIGS. 1 and 2.

Referring now to FIG. 7, an alternative embodiment of an image sensor 172 in an imaging device 170 will be described. In this embodiment, the image sensor 172 includes a memory 176 having at least the capacity to hold the contents of the photodetector array 174. The memory 176 is connected to the photodetector array 174 by a fast bus 180, allowing image data from the photodetector array 174 to be quickly copied into the memory 176 in the free time of a single video frame time slice without disrupting the video stream. The image sensor 172 also includes an image processor 182 and output 186, and supporting circuitry 184 such as a memory controller for copying the image data from the photodetector array 174 to the memory 176. Video frames and still image slices are output from the image sensor 172 to other devices in the imaging device 170, such as a processor 190, a video storage device 192 and still image storage device 194. Processing and outputting of still image data is performed in slices in any free time left in video frame time slices.

Figure 8:
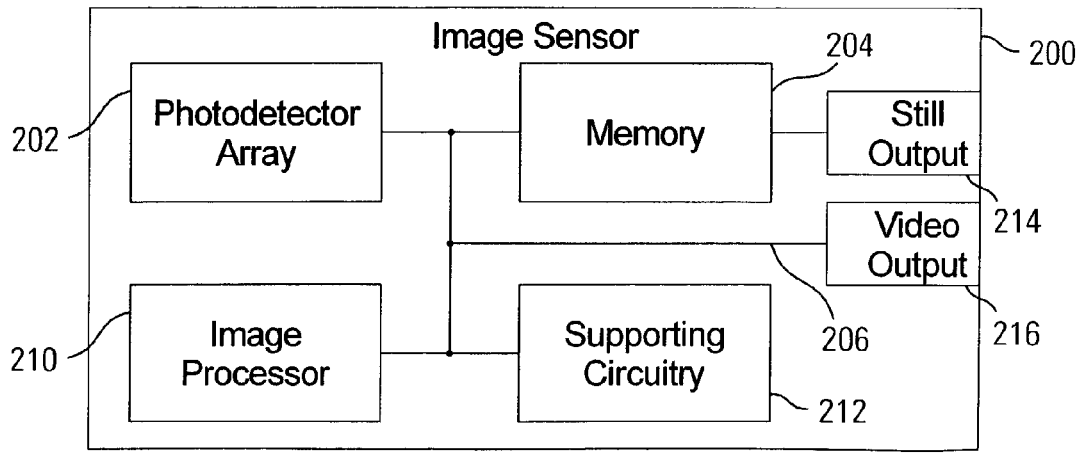
FIG. 8 is a block diagram of another exemplary embodiment of an image sensor having an internal memory for use in an imaging device such as that in FIGS. 1 and 2.

In another alternative embodiment shown in FIG. 8, an image sensor 200 having a photodetector array 202 and memory 204 connected by a fast bus 206 includes a still image data port 214 in addition to a video output 216, so that fully processed still images may be output in a single operation rather than outputting them in slices through a single output between video frames. The image sensor 200 also includes an image processor 210 and supporting circuitry 212 as described above. In this embodiment, the still image data is copied to the memory 204 in a single operation, the processing is then divided into any free time left in video frame time slices, and the full still image may then be read from the memory 204 via the still image data port 214 in a single operation. The memory 204 may comprise a dual-port RAM, or the supporting circuitry 212 may manage reads and writes to the memory 204 to prevent collisions and overwriting of processed but unread image data.

Figure 9:
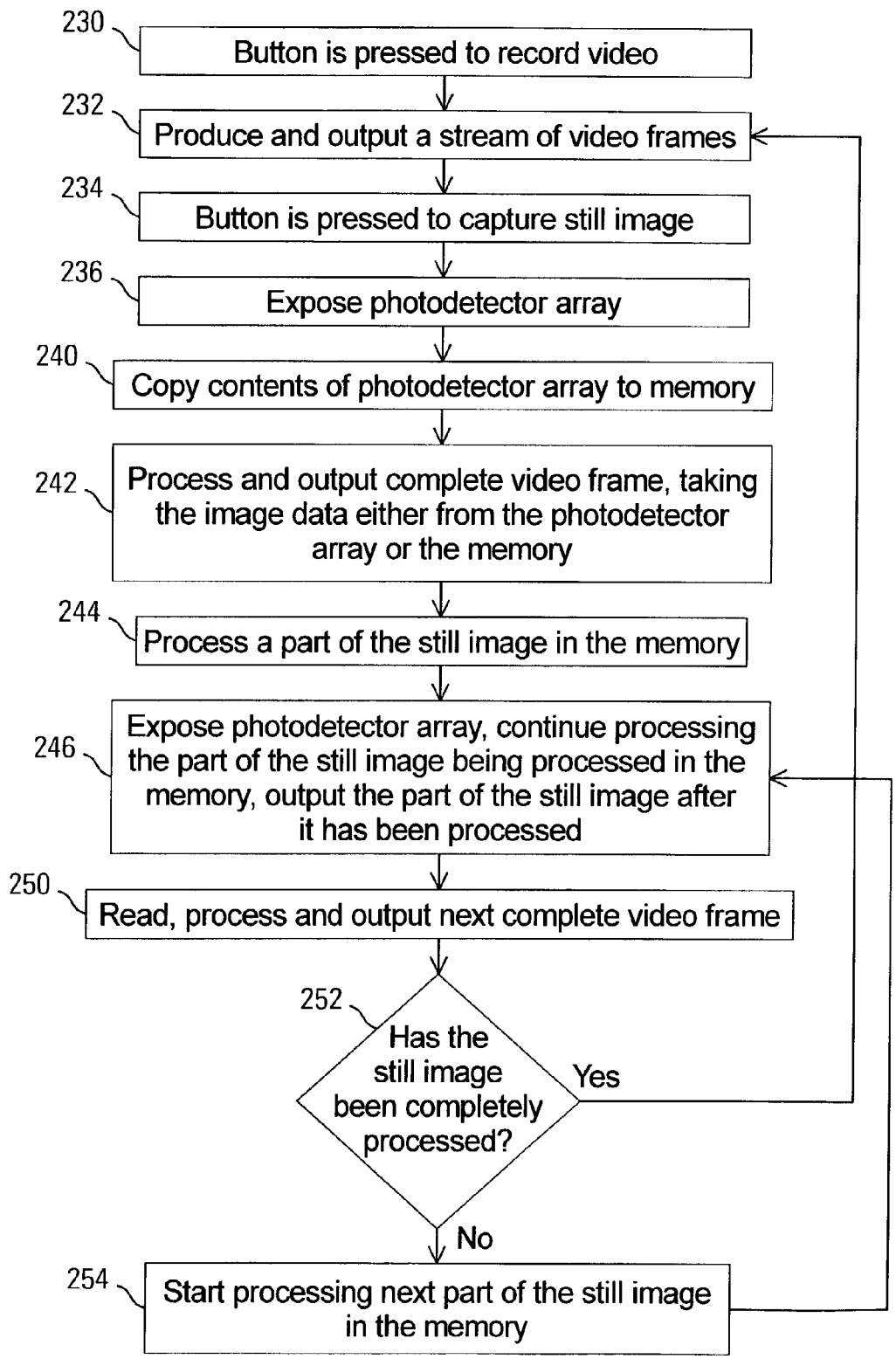
FIG. 9 is a flow chart of an exemplary operation for simultaneously capturing video and still images using the image sensor of FIG. 7.

Referring now to FIG. 9, an exemplary operation for simultaneous capture of video and still images using the image sensor 172 of FIG. 7 will be described. The operation begins when a button on the associated imaging device is pressed 230 to record a video stream. A stream of video frames is exposed, read, processed and output 232 from the image sensor 172 as described above. When a still image capture button is pressed 234 on the imaging device, the still image capture process may begin in the next video frame time slice. The photodetector array 174 is exposed 236, generating the image data for both the video frame and the still image. The image data is copied 240 from the photodetector array 174 to the memory 176. A video frame is processed and output 242, taking the image data either from the photodetector array 174 or the memory 176, depending upon which is most efficient and requires the least complicated circuitry in the image sensor 172. For example, if the memory 176 can be read more quickly than the photodetector array 174, it may be desirable to read the image data for the video frame from the memory 176. In contrast, if it is more simple to reduce the resolution of the image data in the photodetector array 174 than in the memory 176 or while processing in the image processor 182, it may be more desirable to read the low resolution image data from the photodetector array 174.

The processing of the image data for the still image may then begin, although the entire image may be processed more quickly if still image processing is designed to fill the normal free time in a video frame time slice, rather than saving some of the free time for data transfers. In this case, the image data may be copied from the photodetector array 174 to the memory 176 during one video frame time slice, with the processing of still image data beginning in the next video frame time slice. This way, a constant amount of time may be allocated for processing still image slices, rather than having to reduce the time available for processing a still image slice in the video frame time slice also used for copying the still image data.

In either case, a part of the still image in memory 176 is processed 244, whether in the same video frame time slice in which the image data is copied 240 or in the next.

The photodetector array 174 is again exposed 246 for the next video frame. This may begin while the previous still image slice is being processed 244 and output from the image sensor 172. The video frame is read, processed and output 250. If 252 the still image has been completely processed and outputs the generation of the video stream continues 232 until the still image capture button is again pressed 234. If 252 the still image has not been completely processed and output, the processing and outputting of the next part of the still image in memory 176 is begun 254 while the photodetector array 246 is exposed for the next video frame.

Including a memory 176 in the image sensor 172 is advantageous in that blurring due to a rolling shutter is avoided, although the image sensor 172 is more complex and therefore more costly.

Figure 10:
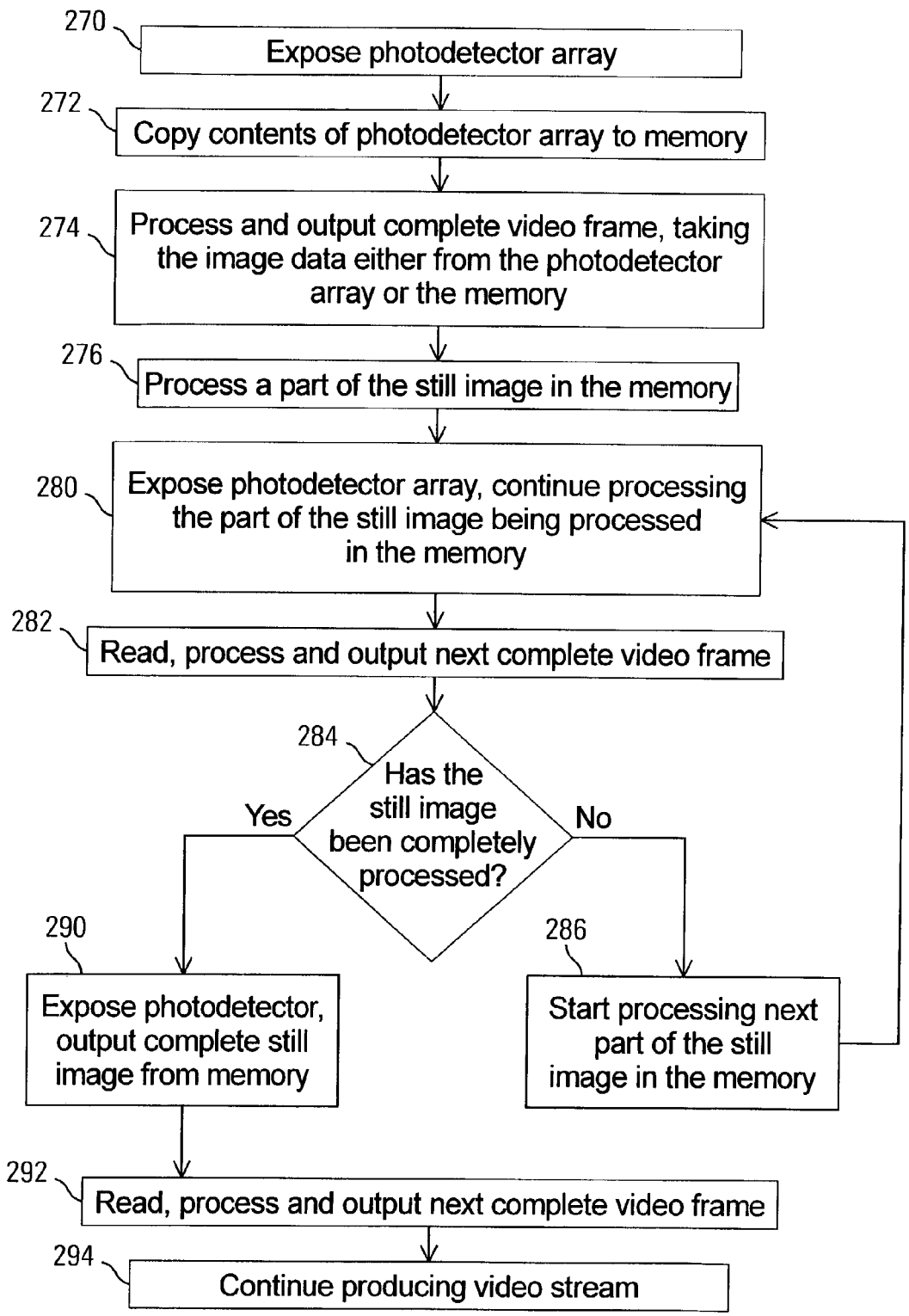
FIG. 10 is a flow chart of another exemplary operation for simultaneously capturing video and still images using the image sensor of FIG. 7.

Referring now to FIG. 10, another exemplary operation for simultaneous capture of video and still images using the image sensor 172 of FIG. 7 will be described. This operation may be used when the image data for an entire still image can be transferred from the image sensor 172 in the free time left in one video frame time slice. The photodetector array 174 is exposed 270, generating the image data for both the video frame and the still image. The image data is copied 272 from the photodetector array 174 to the memory 176. A complete video frame is processed and output 274, taking the image data either from the photodetector array 174 or the memory 176. A slice of the still image in memory 176 is processed 276. The photodetector array 174 is again exposed 280 for the next video frame, with still image processing continuing during the exposure if desired. The video frame is read, processed and output 282. If 284 the still image has not been completely processed, the next still image slice is processed 286 and the photodetector array 174 is exposed 280 for the next video frame. If 284 the still image has been completely processed, the photodetector array 246 is exposed 290 and the complete still image is output from the memory 176. The video stream production continues 294 as before.

As discussed above, the image sensor may not be able to process any still image data in the same video frame time slice in which the high resolution data is copied from the photodetector array to the memory. In this case, the still image data may be copied to the memory 176 in one video frame time slice, with the still image processing being divided among subsequent video frame time slices. Even image sensors with slower image processors may use this technique, using a relatively large number of video frame time slices to completely process a still image, although the rate at which still images may be captured will be limited.

Figure 11:
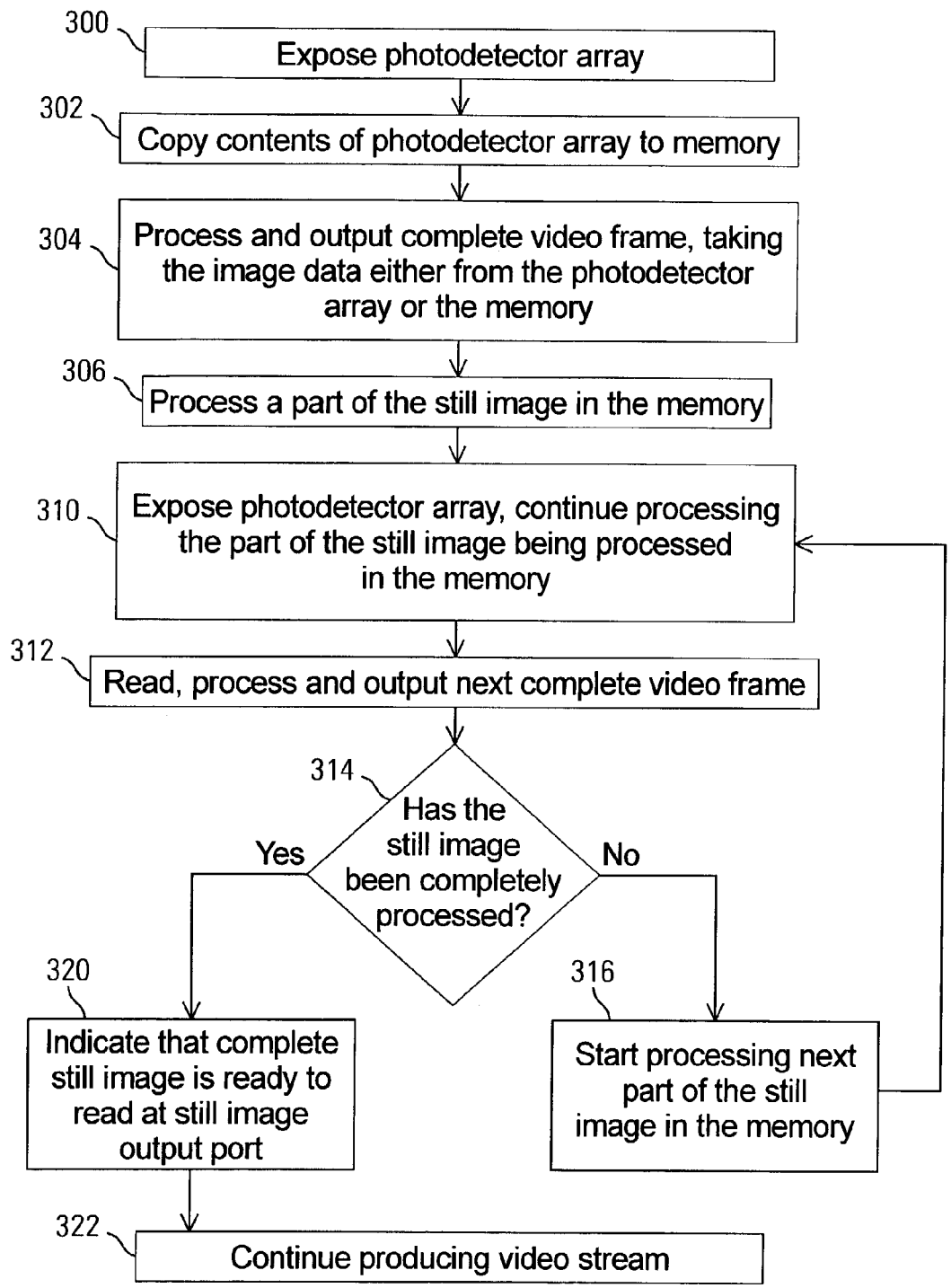
FIG. 11 is a flow chart of an exemplary operation for simultaneously capturing video and still images using the image sensor of FIG. 8.

Referring now to FIG. 11, an exemplary operation for simultaneous capture of video and still images using the image sensor 200 of FIG. 8 will be described. The image sensor 200 of FIG. 8 includes a data port for reading still image data, so the outputting of still images need not be divided into slices between video frames.

The photodetector array 202 is exposed 300, and the entire contents are copied 302 to the memory 204 in a single video frame time slice as described above. A complete video frame is processed and output 304, taking the low resolution image data either from the photodetector array 202 or memory 204 as described above. A still image slice is processed 306, but not output, in any free time left in the video frame time slice. The photodetector array 202 is exposed 310 for the next video frame, while processing of the still image slice continues. (Note that the performance or manner of overlapping of tasks is exemplary only, and is not intended to be limiting.)

When the exposure is complete and the next video frame time slice begins, the next complete video frame is read, processed and output 312 from the image sensor 200. If 314 the still image has been completely processed, the image sensor 200 indicates 320 to the imaging device that the still image is ready to read at the still image output port 214, and the video stream generation continues 322. Note that the imaging device should read and store the still image data from the image sensor 200 before attempting to capture another still image, or the processed still image data in the memory 204 may be overwritten.

If 314 the still image has not been completely processed, the next slice of the still image is processed 316 and the photodetector array 202 is exposed 310 for the next video frame.

The various embodiments described herein for simultaneously capturing video and still images provide for a simple and cost-effective multi-use imaging device that is much easier to use than two dedicated imaging devices. Slicing still image generation tasks in an image sensor also greatly reduces the complexity and power requirements, because a still image need not be completely processed and output in a single video frame time slice.

Various computer readable or executable code or executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or executable instructions may be tangibly embodied on any computer-readable storage medium or in any electronic circuitry for use by or in connection with any instruction-executing device, such as a general purpose processor, software emulator, application-specific circuit, a circuit made of logic gates, etc. that can access or embody, and execute, the code or instructions.

Methods described and claimed herein may be performed by the execution of computer readable or executable code or executable instructions, tangibly embodied on any computer-readable storage medium or in any electronic circuitry as described above.

A storage medium for tangibly embodying computer readable or executable code or executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor, an electromagnetic, optical, infrared transmission, etc. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also be tangibly embodied as an electrical signal in a transmission medium such as the Internet or other types of networks, both wired and wireless.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. An image sensor, comprising:
   a photodetector array; an image processor connected to said photodetector array for processing data from said photodetector array; and a controller connected to said image processor to control said data processing, said controller comprising executable instructions for processing a partial portion of a still image in between processing video image frames, said still image having a higher resolution than said video image frames.

2. The image sensor of claim 1, said instructions for processing a portion of a still image comprising instructions for obtaining a number of lines of picture elements from said photodetector array and processing said number of lines.

3. The image sensor of claim 1, further comprising an output controller for outputting video image frames interleaved with portions of said still image.

4. The image sensor of claim 1, further comprising a memory having sufficient capacity to store an entire output of said photodetector array, said instructions for processing comprising instructions for copying data from said photodetector array to said memory and wherein said instructions for processing said portion of said still image comprise instructions for processing said portion in said memory.

5. The image sensor of claim 1, said photodetector array comprising a complementary metal oxide semiconductor sensor.

6. The image sensor of claim 1, said image sensor comprising a single integrated circuit.

7. The image sensor of claim 1, said instructions comprising computer-readable program code.

8. The image sensor of claim 1, said instructions comprising an electrical circuit.

9. A method for capturing images, the method comprising:
   reading image data in an image sensor from a photodetector array in said image sensor;
   processing said image data in said image sensor, alternating between processing said image data to generate video frames and to generate portions of still images, so that a plurality of video frames are processed in a time it takes to process a complete still image, wherein said video frames have a lower resolution than said still images.

10. The method of claim 9, further comprising outputting said video frames and said portions of still images from said image sensor, wherein said outputting is performed in alternating form, with a portion of a still image being output between successive complete video frames.

11. The method of claim 10, further comprising reading said outputted video frames and said portions of still images from said image sensor, and combining said portions of still images to form at least one complete still image.

12. The method of claim 9, wherein reading said image data for said still images comprises reading said image data with a rolling shutter procedure by alternating between reading image data for a complete video frame and reading image data for a portion of a still image.

13. The method of claim 12, further comprising postprocessing said still images to compensate for a blurring effect caused by said rolling shutter.

14. The method of claim 9, wherein reading said image data for said still images comprises copying said image data for a complete still image from said photodetector array to a memory in said image sensor at one time.

15. The method of claim 14, wherein portions of said image data for a still image are processed in said memory in alternating form between processing said image data to generate successive video frames.

16. The method of claim 14, further comprising outputting said video frames and said portions of still images from said image sensor, wherein said outputting is performed in alternating form, with a portion of a still image being output between successive complete video frames, and wherein said portions of still images are output from said memory.

17. The method of claim 14, further comprising outputting said video frames and said still images from said image sensor, wherein complete still images are output from said image sensor at one time between successive video frames.

18. The method of claim 14, wherein processing said image data to generate at least one video frame comprises processing said image data for said still image from said memory to reduce a resolution of said image data.

19. The method of claim 14, wherein reading said image data for a video frame following a still image comprises rereading said image data at a lower resolution, and wherein said image data for said video frame following a still image and for said still image are captured in a single exposure of said photodetector array.

20. An image sensor, comprising:

means for capturing and processing image data for a stream of lower resolution images and at least one higher resolution image, wherein said stream of lower resolution images is captured and processed at a given rate, and wherein capturing and processing said image data for said at least one higher resolution image is subdivided into portions to perform between said capturing and processing of lower resolution images in said stream so that it does not interfere with said given rate; and means for outputting said stream of lower resolution images and said at least one higher resolution image from said image sensor.

* * * * *